United States Patent
Czerw

(10) Patent No.: US 12,203,225 B2
(45) Date of Patent: Jan. 21, 2025

(54) AUTOMATED POWER MANAGEMENT SYSTEM FOR SURFACE COMPACTOR MACHINE

(71) Applicant: Volvo Construction Equipment AB, Eskilstuna (SE)

(72) Inventor: Michal Czerw, Wroclaw (PL)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 763 days.

(21) Appl. No.: 17/434,391

(22) PCT Filed: Feb. 27, 2019

(86) PCT No.: PCT/IB2019/051583
§ 371 (c)(1),
(2) Date: Aug. 26, 2021

(87) PCT Pub. No.: WO2020/174261
PCT Pub. Date: Sep. 3, 2020

(65) Prior Publication Data
US 2022/0162812 A1   May 26, 2022

(51) Int. Cl.
*E01C 19/28*   (2006.01)
*B60K 6/28*    (2007.10)
(Continued)

(52) U.S. Cl.
CPC ........... *E01C 19/286* (2013.01); *B60K 6/28* (2013.01); *B60L 15/2045* (2013.01);
(Continued)

(58) Field of Classification Search
CPC ....... E01C 19/282; E01C 19/286; B60K 6/28; B60L 15/2045; B60R 16/033; B60Y 2200/92; B60Y 2200/413
(Continued)

(56) References Cited

U.S. PATENT DOCUMENTS

| 3,052,167 A | 9/1962 | Beale |
| 9,580,879 B1 | 2/2017 | Williams |

(Continued)

FOREIGN PATENT DOCUMENTS

| CN | 203583329 U | 5/2014 |
| CN | 103889773 A | 6/2014 |

(Continued)

OTHER PUBLICATIONS

International Search Report and Written Opinion of the International Searching Authority, PCT/IB/2019/051583, mailed Nov. 6, 2019, 10 pages.

(Continued)

*Primary Examiner* — Raymond W Addie
(74) *Attorney, Agent, or Firm* — Sage Patent Group

(57) ABSTRACT

An electronic control unit for a compactor obtains a planned operating profile of the compactor, generates a predicted power expenditure schedule for the compactor based on the planned operating profile, determines, based on the predicted power expenditure schedule, that a predicted energy expenditure of the compactor exceeds an available energy of the compactor, generates a modified operating profile in response to determining that the predicted energy expenditure of the compactor exceeds the available energy of the compactor, and operates the compactor according to the modified operating profile.

16 Claims, 12 Drawing Sheets

(51) Int. Cl.
*B60L 15/20* (2006.01)
*B60R 16/033* (2006.01)

(52) U.S. Cl.
CPC ....... *B60R 16/033* (2013.01); *B60Y 2200/413* (2013.01); *B60Y 2200/92* (2013.01); *E01C 19/282* (2013.01)

(58) Field of Classification Search
USPC .................................. 404/72, 75, 84.05, 117
See application file for complete search history.

(56) References Cited

U.S. PATENT DOCUMENTS

| | | | | |
|---|---|---|---|---|
| 9,982,397 | B2* | 5/2018 | Korb | E01C 19/282 |
| 2008/0096717 | A1 | 4/2008 | Houle et al. | |
| 2010/0087992 | A1* | 4/2010 | Glee | E01C 19/288 |
| | | | | 701/50 |
| 2010/0111605 | A1* | 5/2010 | Sturos | E01C 19/288 |
| | | | | 404/117 |
| 2013/0266373 | A1 | 10/2013 | Pieske et al. | |
| 2013/0302089 | A1 | 11/2013 | Sina | |
| 2014/0000245 | A1 | 1/2014 | Harada et al. | |
| 2014/0171260 | A1* | 6/2014 | Dalum | B60W 10/06 |
| | | | | 903/906 |
| 2015/0167257 | A1* | 6/2015 | Korb | E01C 19/004 |
| | | | | 404/76 |
| 2016/0298308 | A1* | 10/2016 | Oetken | E01C 19/288 |
| 2017/0355373 | A1* | 12/2017 | Dalum | F16H 61/0031 |
| 2018/0086227 | A1 | 3/2018 | Healy et al. | |
| 2018/0186357 | A1 | 7/2018 | Deshpande et al. | |
| 2019/0011834 | A1 | 1/2019 | Tan et al. | |
| 2019/0016329 | A1 | 1/2019 | Park et al. | |
| 2019/0078271 | A1* | 3/2019 | Laugwitz | E01C 19/288 |

FOREIGN PATENT DOCUMENTS

| | | |
|---|---|---|
| CN | 104145398 A | 11/2014 |
| CN | 104627185 A | 5/2015 |
| CN | 105008005 A | 10/2015 |
| CN | 105091892 A | 11/2015 |
| CN | 105383498 A | 3/2016 |
| CN | 108367751 A | 8/2018 |
| CN | 109263640 A | 1/2019 |
| JP | 2009090735 A | 4/2009 |
| WO | 2016184497 A1 | 11/2016 |
| WO | 2018099561 A1 | 6/2018 |

OTHER PUBLICATIONS

Second Office Action and Search Report for Chinese Patent Application No. 201980093098.0, mailed Apr. 28, 2024, 12 pages.
Yongchun Zhou, et al "Introduction to Engineering Machinery", pp. 189-193, Southwest Jiaotong University Press, May 2014, 27 pages.
First Office Action for Chinese Patent Application No. 201980093098.0, mailed Dec. 29, 2023, 13 pages.

* cited by examiner

AUTOMATED POWER MANAGEMENT SYSTEM FOR SURFACE COMPACTOR MACHINE

CROSS REFERENCE TO RELATED APPLICATIONS

This application is a 35 U.S.C. § 371 national stage application of PCT International Application No. PCT/IB2019/051583 filed on Feb. 27, 2021, the disclosure and content of which is incorporated by reference herein in its entirety.

FIELD

The inventive concepts relate to surface compactors machines, and, in particular, to electronic control systems and related methods for surface compactor machines.

BACKGROUND

Surface compactor machines, or surface compactors, are used to compact a variety of substrates, such as asphalt and soil. Surface compactors are provided with one or more compacting surfaces for this purpose. For example, a roller compactor may be provided with one or more cylindrical drums that provide compacting surfaces for compacting soil, asphalt, or other materials.

Roller compactors use the weight of the compactor to compress the surface being rolled. In addition, one or more of the drums of some roller compactors may vibrate to induce additional mechanical compaction of the surface being rolled.

Heavy duty surface compactors typically have two rollers or drums, e.g., front and back rollers, that provide compaction of the surface. An operator cab may be positioned between the rollers. The drums in such a compactor, referred to as tandem drums, may vibrate or be static, and may be driven by a motor mounted in or under the operator cab.

A single-drum (or unidrum) compactor only includes a single compacting drum. A conventional single drum compactor may include drive tires that propel the compactor and an operator cab positioned between the drum and the drive tires. For light duty, walk behind single drum compactors are also known. Such compactors may be driven by motors provided within the drum, such as the walk-behind compactor illustrated in U.S. Pat. No. 3,052,167.

SUMMARY

This summary is provided to introduce simplified concepts that are further described below in the Detailed Description. This summary is not intended to identify essential features of the claimed subject matter, nor is it intended for use in determining the scope of the claimed subject matter.

An electronic control unit for a compactor according to some embodiments includes a processor circuit and a memory coupled to the processor circuit. The memory comprises computer readable program instructions that, when executed by the processor circuit, cause the electronic control unit to perform operations including obtaining a planned operating profile of the compactor, generating a predicted power expenditure schedule for the compactor based on the planned operating profile, determining, based on the predicted power expenditure schedule, that a predicted energy expenditure of the compactor exceeds an available energy of the compactor, generating a modified operating profile in response to determining that the predicted energy expenditure of the compactor exceeds the available energy of the compactor, and operating the compactor according to the modified operating profile.

A method according to some embodiments of operating an electronic control unit for a compactor includes obtaining a planned operating profile of the compactor, generating a predicted power expenditure schedule for the compactor based on the planned operating profile, determining, based on the predicted power expenditure schedule, that a predicted energy expenditure of the compactor exceeds an available energy of the compactor, generating a modified operating profile in response to determining that the predicted energy expenditure of the compactor exceeds the available energy of the compactor, and operating the compactor according to the modified operating profile.

A computer program product according to some embodiments includes a non-transitory computer readable storage medium having computer readable program code embodied in the medium, the computer readable program code comprising computer program instructions that, when executed on a processor circuit of an electronic control unit of a compactor, cause the electronic control unit to perform operations including obtaining a planned operating profile of the compactor, generating a predicted power expenditure schedule for the compactor based on the planned operating profile, determining, based on the predicted power expenditure schedule, that a predicted energy expenditure of the compactor exceeds an available energy of the compactor, generating a modified operating profile in response to determining that the predicted energy expenditure of the compactor exceeds the available energy of the compactor, and operating the compactor according to the modified operating profile.

An electronic control unit for a construction vehicle according to some embodiments includes a processor circuit and a memory coupled to the processor circuit. The memory comprises computer readable program instructions that, when executed by the processor circuit, cause the electronic control unit to perform operations including obtaining a planned operating profile of the construction vehicle, generating a predicted power expenditure schedule for the construction vehicle based on the planned operating profile, determining, based on the predicted power expenditure schedule, that a predicted energy expenditure of the construction vehicle exceeds an available energy of the construction vehicle, generating a modified operating profile in response to determining that the predicted energy expenditure of the construction vehicle exceeds the available energy of the construction vehicle, and operating the construction vehicle according to the modified operating profile.

A method according to some embodiments of operating an electronic control unit for a construction vehicle includes obtaining a planned operating profile of the construction vehicle, generating a predicted power expenditure schedule for the compactor based on the planned operating profile, determining, based on the predicted power expenditure schedule, that a predicted energy expenditure of the construction vehicle exceeds an available energy of the construction vehicle, generating a modified operating profile in response to determining that the predicted energy expenditure of the construction vehicle exceeds the available energy of the construction vehicle, and operating the construction vehicle according to the modified operating profile.

ASPECTS OF THE INVENTIVE CONCEPTS

In one aspect, an electronic control unit for a compactor includes a processor circuit and a memory coupled to the processor circuit. The memory comprises computer readable program instructions that, when executed by the processor circuit, cause the electronic control unit to perform operations including obtaining a planned operating profile of the compactor, generating a predicted power expenditure schedule for the compactor based on the planned operating profile, determining, based on the predicted power expenditure schedule, that a predicted energy expenditure of the compactor exceeds an available energy of the compactor, generating a modified operating profile in response to determining that the predicted energy expenditure of the compactor exceeds the available energy of the compactor, and operating the compactor according to the modified operating profile.

In one aspect, the planned operating profile of the compactor may include a predicted movement path and a predicted vibration profile for the compactor.

In one aspect, generating the modified operating profile may include modifying the predicted movement path or the predicted vibration profile of the compactor.

In one aspect, the planned operating profile of the compactor may include a predicted power expenditure schedule, and generating the modified operating profile may include modifying the predicted power expenditure schedule of the compactor.

In one aspect, the predicted power expenditure schedule of the compactor may specify sources of power for the compactor over a range of operation covered by the planned operating profile of the compactor.

In one aspect, the compactor may include a hybrid power source including an electric power source and an internal combustion engine, and the power source profile may specify a first percentage of power supplied by the electric power source and a second percentage of power supplied by the internal combustion engine over a time period covered by the power source profile.

In one aspect, the electric power source may include a supercapacitor and/or an electrochemical battery.

In one aspect, the planned operating profile of the compactor may include a predicted power expenditure schedule that specifies how power generated by the compactor is allocated among a plurality of operating subsystems of the compactor, and generating the modified operating profile may include modifying the predicted power expenditure schedule of the compactor.

In one aspect, the plurality of operating subsystems of the compactor include a traction power subsystem, a vibration subsystem and an electronics power subsystem.

In one aspect, generating the modified operating profile may include reducing a power budget of one of the plurality of operating subsystems of the compactor.

In one aspect, the electronic control unit may, in response to determining that the predicted energy expenditure of the compactor exceeds the available energy of the compactor, display an informational message to an operator of the compactor.

In one aspect, the predicted power expenditure schedule may be based on a fuel level of the compactor, ambient temperature, compaction speed, vibration frequency, vibration amplitude, maximum compaction time, compaction distance, width of compaction track, compaction substrate type, compaction substrate temperature, and/or compaction substrate thickness.

In one aspect, the predicted power expenditure schedule may be based on a state of charge of the supercapacitor or the chemical battery.

In one aspect, a method of operating an electronic control unit for a compactor includes obtaining a planned operating profile of the compactor, generating a predicted power expenditure schedule for the compactor based on the planned operating profile, determining, based on the predicted power expenditure schedule, that a predicted energy expenditure of the compactor exceeds an available energy of the compactor, generating a modified operating profile in response to determining that the predicted energy expenditure of the compactor exceeds the available energy of the compactor, and operating the compactor according to the modified operating profile.

In one aspect, a computer program product includes a non-transitory computer readable storage medium having computer readable program code embodied in the medium, the computer readable program code comprising computer program instructions that, when executed on a processor circuit of an electronic control unit of a compactor, cause the electronic control unit to perform operations including obtaining a planned operating profile of the compactor, generating a predicted power expenditure schedule for the compactor based on the planned operating profile, determining, based on the predicted power expenditure schedule, that a predicted energy expenditure of the compactor exceeds an available energy of the compactor, generating a modified operating profile in response to determining that the predicted energy expenditure of the compactor exceeds the available energy of the compactor, and operating the compactor according to the modified operating profile.

In a further aspect, an electronic control unit for a construction vehicle includes a processor circuit and a memory coupled to the processor circuit. The memory comprises computer readable program instructions that, when executed by the processor circuit, cause the electronic control unit to perform operations including obtaining a planned operating profile of the construction vehicle, generating a predicted power expenditure schedule for the construction vehicle based on the planned operating profile, determining, based on the predicted power expenditure schedule, that a predicted energy expenditure of the construction vehicle exceeds an available energy of the construction vehicle, generating a modified operating profile in response to determining that the predicted energy expenditure of the construction vehicle exceeds the available energy of the construction vehicle, and operating the construction vehicle according to the modified operating profile.

In a further aspect, a method of operating an electronic control unit for a construction vehicle includes obtaining a planned operating profile of the construction vehicle, generating a predicted power expenditure schedule for the compactor based on the planned operating profile, determining, based on the predicted power expenditure schedule, that a predicted energy expenditure of the construction vehicle exceeds an available energy of the construction vehicle, generating a modified operating profile in response to determining that the predicted energy expenditure of the construction vehicle exceeds the available energy of the construction vehicle, and operating the construction vehicle according to the modified operating profile.

DETAILED DESCRIPTION OF EMBODIMENTS

While embodiments of the inventive concepts are illustrated and described herein, the device may be embodied in many different configurations, forms and materials. The present disclosure is to be considered as an exemplification of the principles of the inventive concepts and the associated functional specifications for their construction and is not intended to limit the inventive concepts to the embodiments illustrated. Those skilled in the art will envision many other possible variations within the scope of the present inventive concepts.

Figure 1:
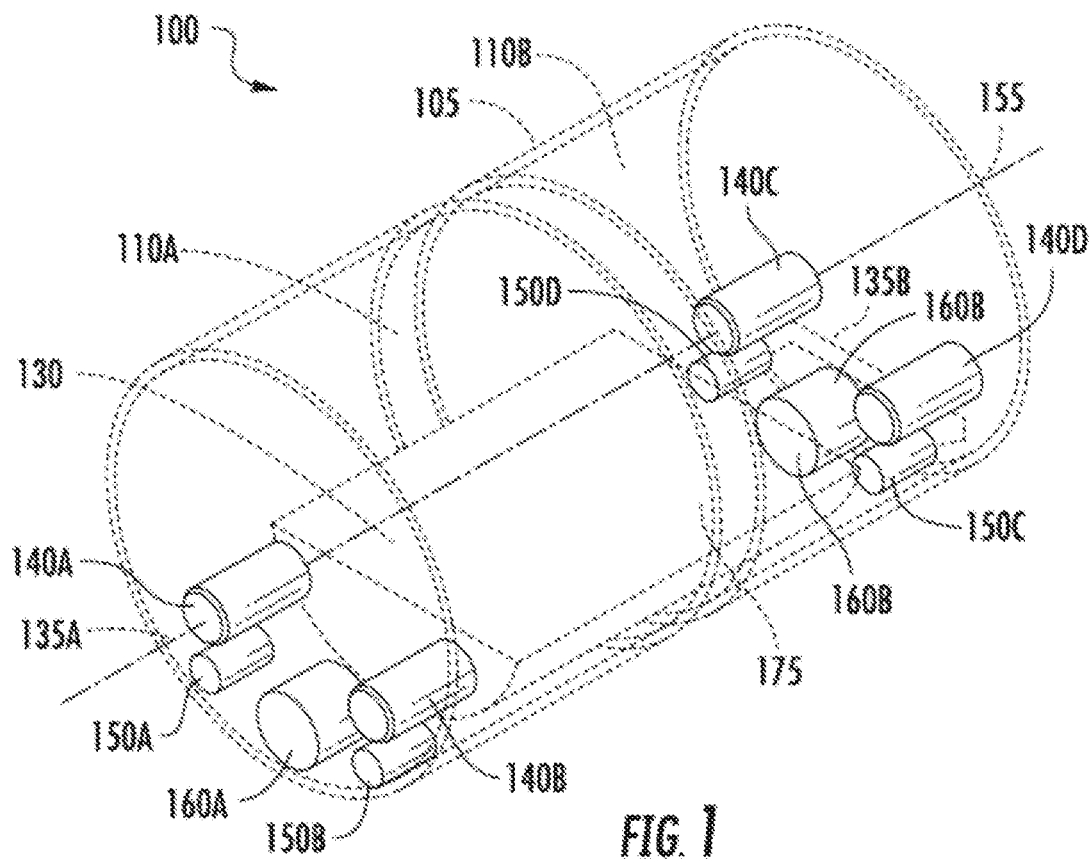
FIG. 1 is a perspective view of a single drum surface compactor machine according to some embodiments.
Figure 2:
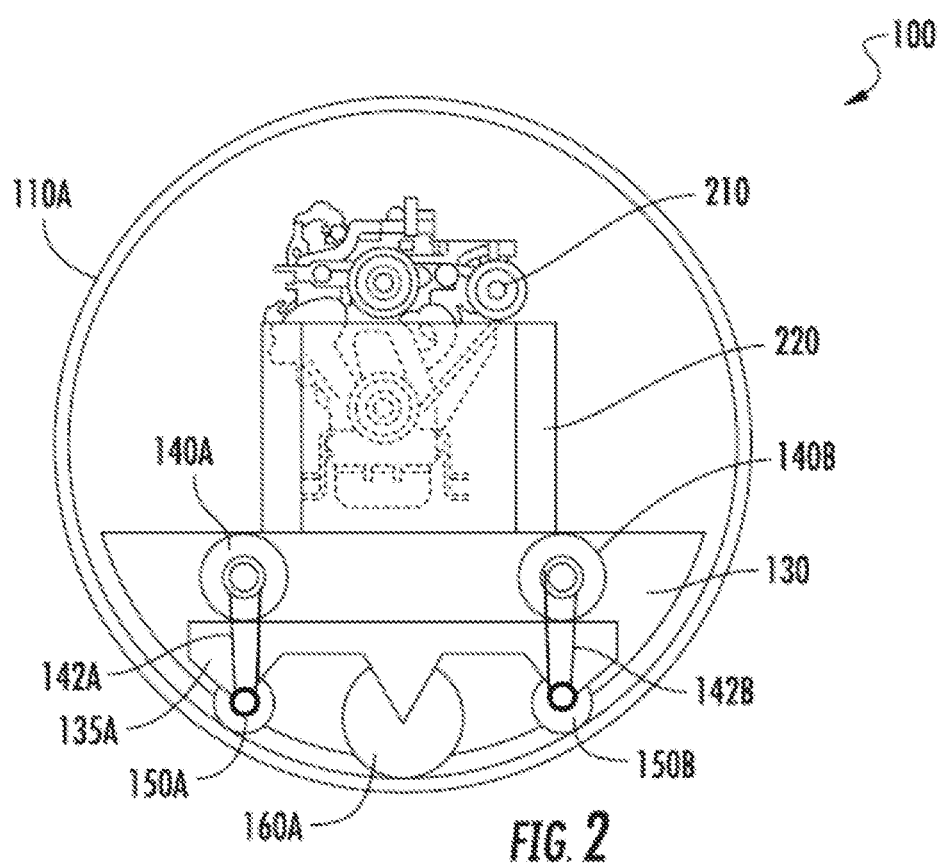
FIG. 2 is a side cross-sectional view of a single drum surface compactor machine according to some embodiments.
Figure 3:
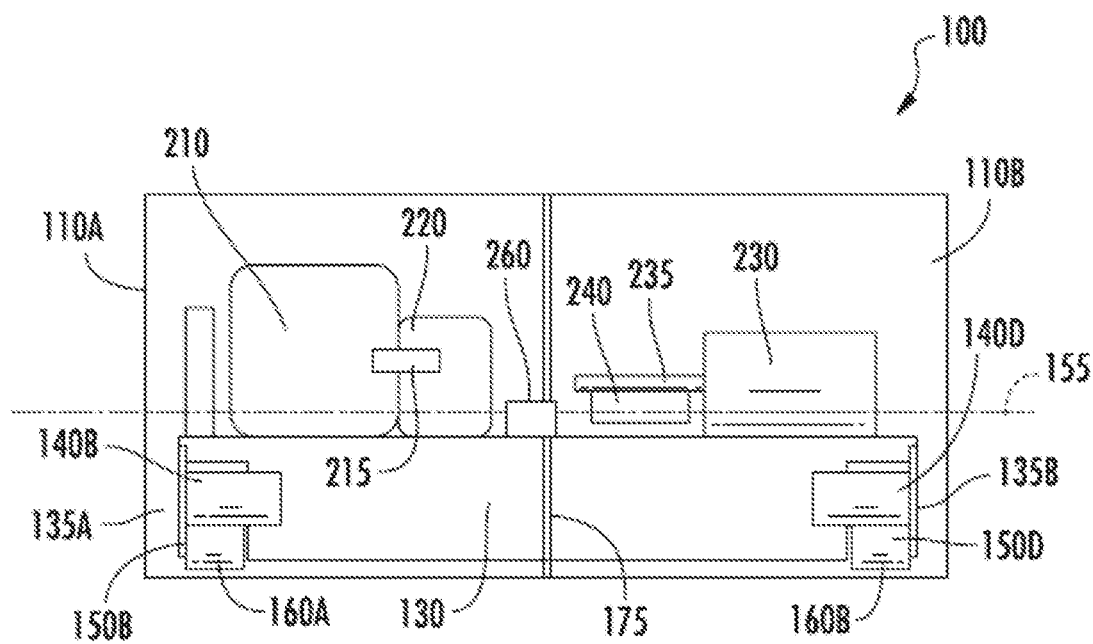
FIG. 3 is a front cross-sectional view of a single drum surface compactor machine according to some embodiments.

Embodiments of the inventive concepts are described herein in the context of an autonomous single roller surface compactor. It will be appreciated, however that the inventive concepts described herein can be applied and/or implemented in many different types of surface compactors and other construction vehicles. Turning now to FIGS. 1, 2 and 3, construction vehicle in the form of a single roller surface compactor machine 100 is depicted. In particular, FIG. 1 is a perspective view, FIG. 2 is a side cross-sectional view and FIG. 3 is a front cross-sectional view of a single drum surface compactor machine 100.

As shown in FIGS. 1 to 3, the surface compactor 100 is a rolling compactor provided with a single roller 105 having a split roller configuration. In some embodiments, the roller 105 includes first and second drums 110A, 110B that are attached via a rotational coupling 175 that permits independent rotation of the first and second drums 110A, 110B along a common axis of rotation 155. Split roller configurations are known in the art. In some embodiments, the surface compactor 100 may be a remotely controlled or autonomous vehicle.

In operation, the roller 105 propels the surface compactor 100 along a substrate to be compacted, such as asphalt, earth, rocks, etc. As the compactor 100 moves across a substrate, the roller 105 applies a compaction force to the substrate.

As shown in FIGS. 1 to 3, the rolling compactor 100 is provided with compacting surfaces in the form of first and second drums 110A, 110B that are cylindrical in shape. The outer circumferential surfaces of the drums 110A, 110B contact the substrate that is to be compacted. As the roller 105 propels the surface compactor 100 along the substrate, the drums 110A, 110B exert a heavy compacting force on the substrate.

According to some embodiments, the roller 110 is driven by one or more electric motors positioned within an interior cylindrical space defined by the first and second drums 110A, 110B. In the embodiments illustrated in FIGS. 1 to 3, the compactor 100 includes first to fourth electric drive motors 140A, 140B, 140C, 140D mounted within a cylindrical interior space defined by the first and second drums 110A, 110B. Although four drive motors are illustrated, more than four or less than four drive motors may be included in some example embodiments. The first and second electric motors 140A, 140B are mounted on a first support bracket 135A in the first drum 110A, while the third and fourth electric motors 140C, 140D are mounted on a second support bracket 135B in the second drum 110B. Each of the first to fourth electric motors 140A to 140D is coupled, for example, via a drive chain 142A, 142B, drive shaft, drive belt, direct gear drive and/or other drive mechanism, to a respective drive wheel 150A to 150D, such that each electric drive motor 140A to 140D causes the respective drive wheel 150A to 150D to turn.

The first and second drive wheels 150A, 150B are mounted to the first support bracket 135A, while the third and fourth drive wheels 150C, 150D are mounted to the second support bracket 135B. The first and second drive wheels 150A, 150B are positioned to be in contact with an inner surface of the first drum 110A, while the third and fourth drive wheels 150C, 150D are positioned to be in contact with an inner surface of the second drum 110B. In some embodiments, the first and second drive wheels 150A, 150B are positioned to be in contact with a first track 175 (FIG. 4) provided an inner surface of the first drum 110A, while the third and fourth drive wheels 150C, 150D are positioned to be in contact with a second track 175 (FIG. 4) provided an inner surface of the second drum 110B. The track may include a rail, channel, slot, gear teeth, or any other suitable feature that maintains contact with the drive wheels 150C, 150D.

The first and second drive wheels 150A, 150B may be circumferentially offset from one another, while the third and fourth drive wheels 150C, 150D may be circumferentially offset from one another. For example, as illustrated in FIG. 2, the first and second drive wheels 150A, 150B may be circumferentially offset from one another by an angle of about 60 degrees.

The first and second drive wheels 150A, 150B may in some embodiments be spring biased against the interior surface of the first drum 110A, and the third and fourth drive wheels 150C, 150D may be spring biased against the interior surface of the second drum 110B so that the drive wheels maintain a firm contact on the interior surfaces of the respective drums. In some embodiments, the drive wheels 150A-150D may be biased against the drums 110A, 110B using leaf springs, coil springs or any other suitable spring mechanism. In yet other embodiments the drive wheels 150A-150D may be held in place against the drums 110A, 110B using only gravity. In still other embodiments the drive wheels may engage respective circular tracks on the interior surfaces of the drums 110A, 110B.

Accordingly, when the first and second drive wheels 150A, 150B are driven by the respective electric drive motors 140A, 140B, a torque is transmitted to the first drum 110A, causing the first drum 110A to rotate. Likewise, when the third and fourth drive wheels 150C, 150D are driven by the respective electric drive motors 140C, 140D, a torque is transmitted to the second drum 110B, causing the second drum 110B to rotate.

It will be appreciated that the first and second drive wheels 150A, 150B may be driven independently from the third and fourth drive wheels 150C, 150D, so that the first drum 110A and the second drum 110A may be rotated independently of one another by the drive wheels 150A to 150D. For example, the first drum 110A and the second drum 110B may be rotated at different speeds and/or in different directions by their respective drive wheels. Allowing the drums 110A, 110B to rotate at different speeds may reduce shearing forces that may be transmitted to the substrate when the compactor 100 is driven in a curved path over the substrate.

The compactor 100 further includes a counterweight 130 positioned within the cylindrical interior space defined by the first drum 110A and the second drum 110B. The counterweight 130 may provide a major portion of the weight of the compactor 100. For example, in some embodiments suitable for heavy duty operation, the counterweight 130 may have a weight greater than 100 kilograms, and in further embodiments greater than 500 kilograms. The counterweight 130 may be attached at opposite ends thereof to the first support bracket 135A and the second support bracket 135B, which suspend the counterweight 130 in a spaced relation to the drums 110A, 110B.

In some embodiments, the first to fourth drive wheels 150A to 150D may bear at least part of the weight of the counterweight 130. For example, as illustrated in FIG. 2, since the drive wheels 150A and 150B are positioned on the support frame beneath the counterweight 130, they may support at least some of the weight of the counterweight 130. In other embodiments, one or more of the drive wheels may be positioned such that they do not bear any of the weight of the counterweight 130. For example, in some embodiments, one or more of the drive wheels 150A to 150D may contact the inner surface of the drum 110A, 110B above the counterweight 130.

A first non-driven support wheel 160A is attached to the first support bracket 135A, and a second non-driven support wheel 160B is attached to the second support bracket 135B. The first and second non-driven support wheels 160A, 160B may rotate around a common axis of rotation that is parallel to the axis of rotation of the drums 110A, 110B. The first non-driven support wheel 160A is positioned in a lower portion of the first drum 110A, and rests against a lower portion of the first drum 110A. Likewise, the second non-driven support wheel 160B is positioned in a lower portion of the second drum 110B, and rests against a lower portion of the second drum 110B. The first and second non-driven support wheels 160A, 160B thereby carry a major portion of the weight of the counterweight 130 and the first and second support brackets 135A, 135B, as well as the weight of other items supported by the counterweight 130 and/or the first and second frames 135A, 135B, as discussed below. The weight carried by the first non-driven support wheel 160A is transmitted directly to the lower portion of the first drum 110A, while the weight carried by the second non-driven support wheel 160B is transmitted directly to the lower portion of the second drum 110B. The non-drive support wheels 160A, 160B may collectively carry a major portion of the weight of the counterweight 130, while the drive wheels 150A to 150D may collectively carry a minor portion of the weight of the counterweight 130. In some embodiments, the first and second non-driven support wheels 160A, 160B may ride in or on channels 175 (FIG. 4) provided on the inner surfaces of the first and second drums 110A, 110B.

Referring to FIGS. 2 and 3, the counterweight 130 may have a generally semi-cylindrical shape that fits within a bottom portion of the cylindrical space defined by the first and second drums 110A, 110B. Because the counterweight 130 accounts for a major portion of the total weight of the compactor 100, a center of gravity of the compactor 100 may be located substantially beneath the central axis 155 of the drums 110A, 110B.

Still referring to FIGS. 2 and 3, a number of other components of the compactor 100 may be mounted on the counterweight 130. For example, an engine 210 and a generator 220 may be mounted on and supported by the counterweight 130. The engine 210 may include a drive shaft 215 that drives the generator 220. The generator 220 responsively generates electric power that is used to drive the drive motors 140A to 140D. An electronic control unit (ECU) 260 controls the individual speeds of the drive motors 140A to 140D.

A vibration mechanism may be provided within the cylindrical drum. The vibration mechanism is configured to vibrate the counterweight and thereby the entire drum to improve the compaction rate of the substrate. In the illustrated embodiments, the vibration mechanism includes a vibration motor 230 mounted on the counterweight 130. The vibration motor 230 includes an output shaft 235 and an eccentric weight 240 attached to the output shaft 235. When the vibration motor 230 spins the output shaft 235 and the eccentric weight 240, a vibrational force is applied to the first and second drums 110A, 110B through the counterweight 130. In this manner, the first and second drums 110A, 110B may be vibrated during operation of the compactor 100. Operation of the vibration motor 230 may also be controlled by the ECU 260. Other vibration mechanisms may be provided instead of or in addition to the vibration mechanism illustrated in FIGS. 2 and 3.

A compactor 100 as described herein may operate autonomously and/or through remote control. That is, the compactor 100 may not be attached to a cab or to external drive wheels, but instead may be a self-contained unit as shown. In other embodiments however, the compactor 100 may be attached to other elements, such as external wheels for stability, an operator cab, etc.

Figure 4:
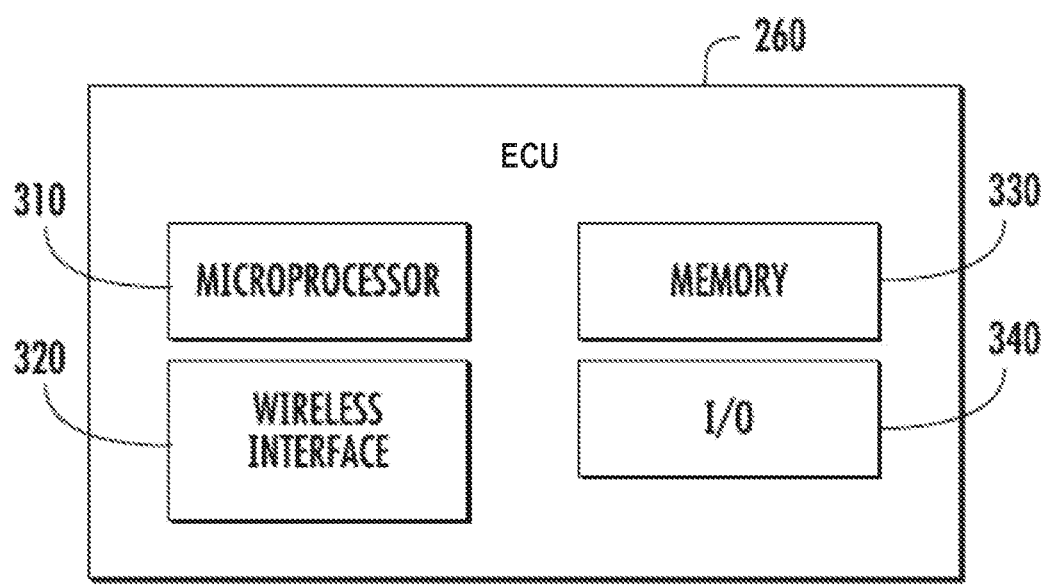
FIG. 4 is a block diagram of an electronic control unit for a single drum surface compactor machine according to some embodiments.

FIG. 4 is a block diagram of an ECU 260 for a compactor 100 according to some embodiments. In particular, the ECU 260 may include a microprocessor or microcontroller circuit 310 (or simply processor circuit 310), a memory 330, a wireless interface 320, and an input/output (I/O) interface 340. The processor circuit 310 may communicate with the other elements of the ECU 260 through a system bus, I2C connection or other connection. In some embodiments, the system bus may conform to the J1939 communication standard for vehicles. Other protocols, such as CANopen and LIN may also be used. The memory 330 may include a volatile or nonvolatile RAM, ROM, EPROM or other suitable storage. The wireless interface 320 enables the ECU 260 to communicate with external devices, such as an external remote control device, sensors, telemetry devices, etc., using a wireless communication protocol, such as Bluetooth, WiFi, etc. The I/O interface 340, which may for example include a universal asynchronous receive transmit (UART) interface, enables the ECU 260 to communicate with other electronic elements of the compactor 100.

In some embodiments, the electrical system of the compactor 100 may include separate DC and AC components. The generator 220 may be AC or DC generator that generates an AC voltage and/or a rectified DC (12V, 24V or 48V) voltage for powering various subsystems in the compactor 100. A battery may also be provided to assist in startup of the engine 210 and/or the vibration motor 230.

Figure 5A:
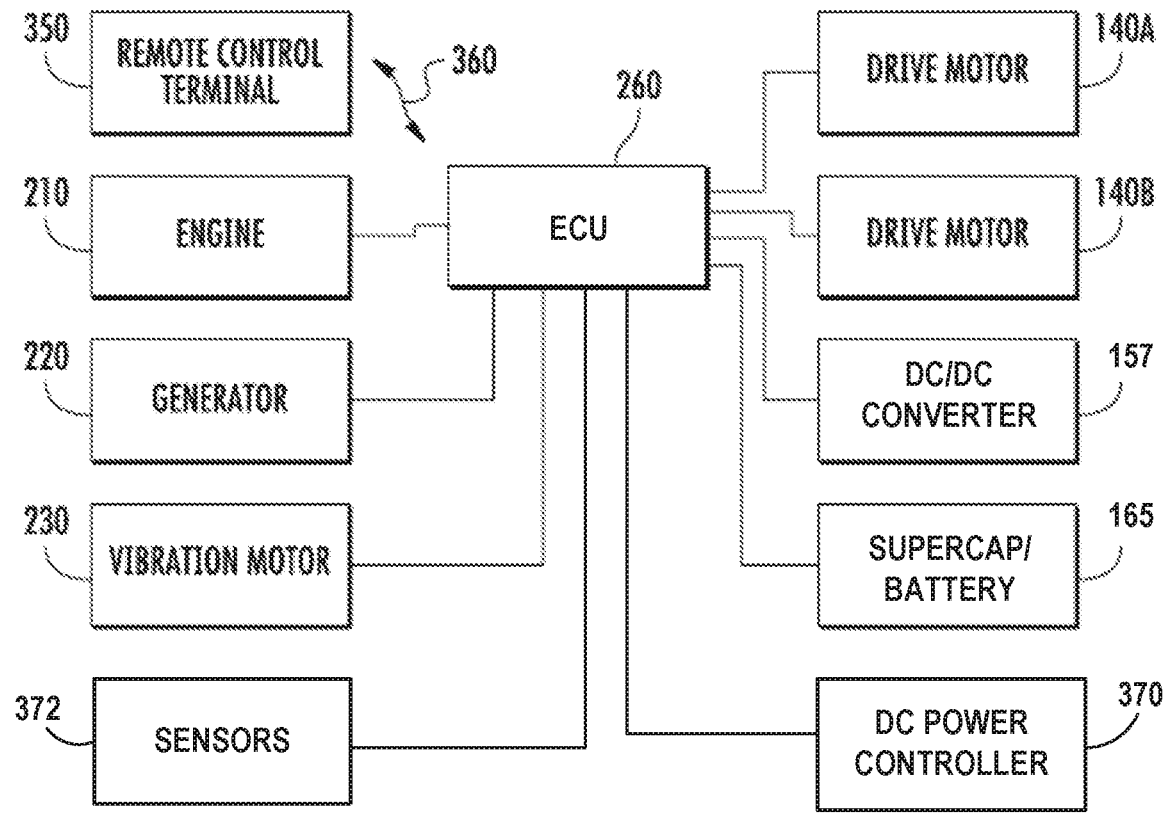
FIGS. 5A and 5B are block diagrams that illustrate interconnections between the control circuit and other elements of a single drum surface compactor machine according to some embodiments.

FIG. 5A is a block diagram that illustrates electrical interconnections between an ECU in the form of an ECU 260 and other elements of a single drum surface compactor 100 according to some embodiments. As shown in FIG. 5A, the ECU 260 may be electrically connected to and control operation of the engine 210, the generator 220, the vibration motor 230 and the drive motors 140A, 140B (drive motors 140C and 140D are not illustrated in FIG. 5A, but may be present in the system). The ECU 260 may also be connected via a wireless interface 360 to a remote control (human-machine interface, or HMI) terminal 350 that can be used to remotely control operation of the compactor 100.

The ECU 260 is further connected to a DC/DC converter for supplying 12V power to an on-board electrical system and a DC power controller 360 for distributing DC power to various subsystems in the compactor 100 as described in more detail below. The compactor 100 may have a hybrid power system that generates power using both an internal combustion power source, such as diesel power, using the engine 210 and an electrical power source. Accordingly, an electrical power supply 165 including a supercapacitor or supercapacitor bank and/or an electrochemical battery may also be coupled to the control circuit.

The compactor 100 further includes a DC power controller 370 coupled to the ECU 260 that controls distribution of DC power to load systems within the compactor 100.

The compactor 100 further includes one or more sensors 372 coupled to the ECU 260 for providing real-time data regarding the operating condition and/or environment of the compactor 100 to the ECU 260. The sensors can be mounted externally or integrated into electrical components of the ECU 260, and may include sensors such as one or more current sensors to monitor current supplied to/from various subsystems and one or more voltage sensors to monitor the DC voltage supplied to/from various subsystems. The current/voltage sensors may be integrated within power/motor controllers and/or inverters in the electrical system.

The compactor 100 may further include one or more state of charge sensors to monitor a state of charge of a supercapacitor and/or electrochemical battery.

The compactor 100 may further include a motor speed sensor at each motor. In particular, a motor speed sensor may be positioned at each motor's shaft and may be integrated in the motor as a 6-step Hall angle sensor.

The compactor 100 may further include a gyroscopic/inertial measurement unit for balancing the drum 110 and determining the actual inclination of the ground beneath the drum.

The compactor 100 may further include a fuel level sensor, one or more temperature sensors to obtain temperature readings of the substrate and/or the ambient temperature, a GPS device for determining/tracking the compaction path and calculating the overall energy balance, and one or more laser sensors/reflectors (mounted on compactor or paver) to help guide/track the compactor during the compaction process.

Figure 5B:
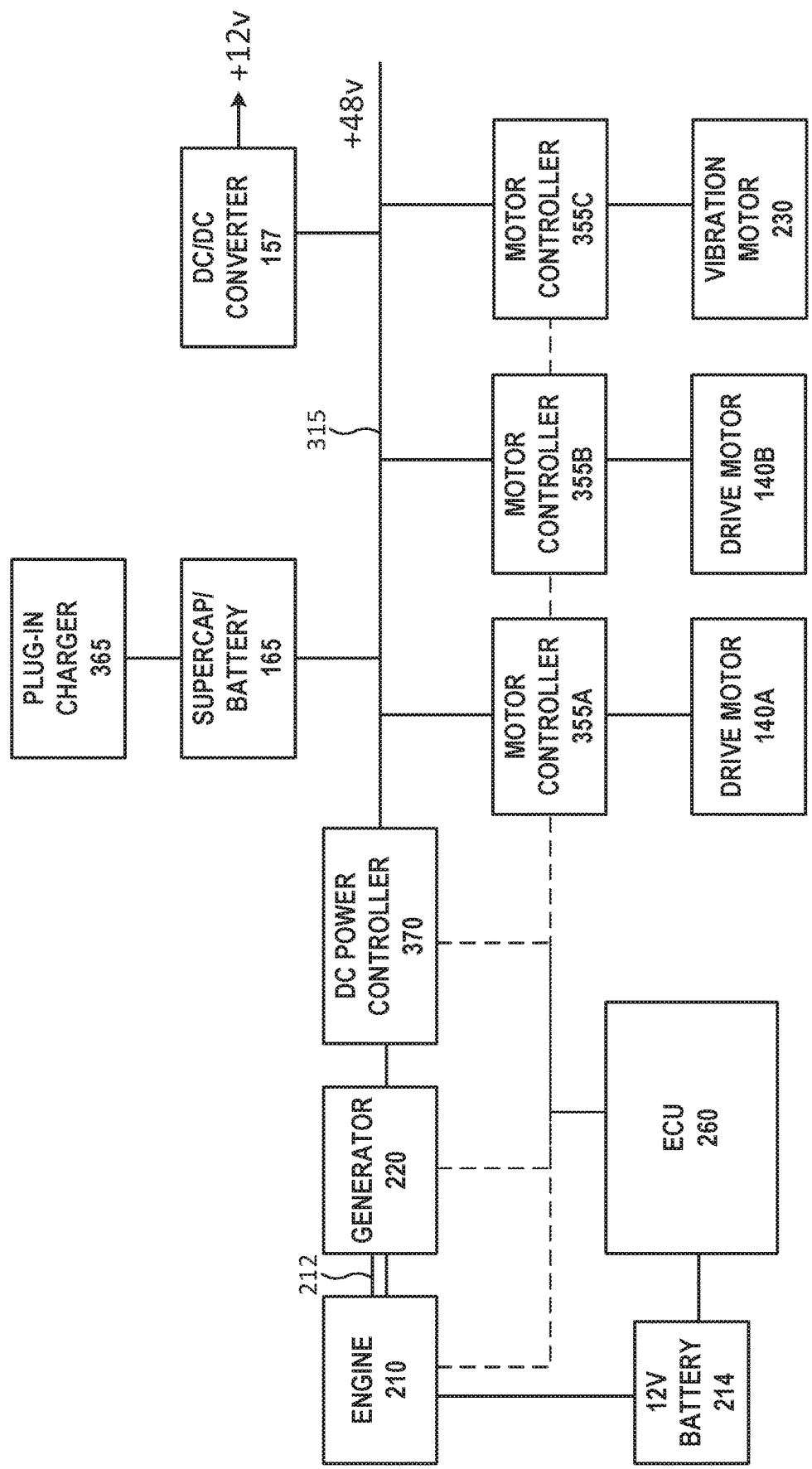

FIG. 5B is a block diagram that illustrates elements and interconnections of the electrical system within the compactor 100 according to particular embodiments in more detail. As shown in FIG. 5B, the engine 210, which may be a diesel-powered engine, such as a Kubota 03 series engine capable of generating 18.5 KW of power, drives the generator 220 via a drive shaft 212. It will be appreciated that other types of combustion engines, including gasoline powered engines, propane engines, or liquid natural gas engines, may be used instead of a diesel engine. The generator 220 generates a three-phase AC output which is provided to a DC power controller 370. The DC power controller 370 converts the AC power to DC and supplies 48V DC power to a DC power bus 315. The engine 210, the generator 220 and the DC power controller 370 are controlled by the ECU 260. A 12V battery 214 provides start-up power for the engine 210 and initial power for the control circuit 260. The DC power controller 370 may be implemented using, for example, an ACS48L90 motor controller by Inmotion Technologies, AB.

The drive motors 140A, 140B and the vibration motor 230 are connected to and draw power from the DC power bus 315 via respective motor controllers 355A, 355B, 355C, which may be implemented using, for example, ACS48M45 motor controllers by Inmotion Technologies, AB. A DC/DC converter 157 is connected to and draws power from the DC power bus 315 to generate a 12V DC supply voltage for driving the 12V electrical system of the compactor 100. Drive motors 140C and 140D are not illustrated in FIG. 5B, but may be present in the system along with associated motor controllers (not shown).

A hybrid electrical power system is provided by means of an electrical power source, such as a 48V supercapacitor bank and/or electrochemical battery 165. The electrical power source may be provided with a plug-in charging adaptor 365 including a pre-charge resistor (not shown) for off-line charging. A shunt resistor (not shown) may be provided between the DC power bus 315 and ground.

Figure 6:
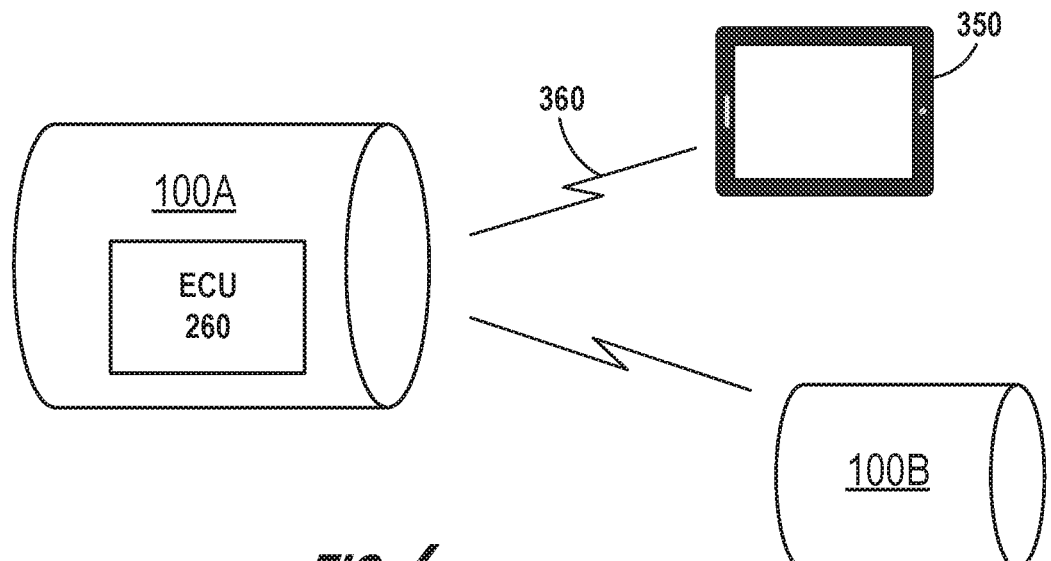
FIG. 6 is a block diagram that illustrates wireless communication between a single drum surface compactor machine and a human-machine interface and another single drum surface compactor machine according to some embodiments.

Referring to FIG. 6, an autonomous single drum compactor 100A including an ECU 260 is illustrated. As shown in FIG. 6, the single drum compactor 100A may communicate via a wireless connection 360 with a control panel (HMI) 350 and/or with another autonomous single drum compactor 100B, as will be described in greater detail below.

Figure 7:
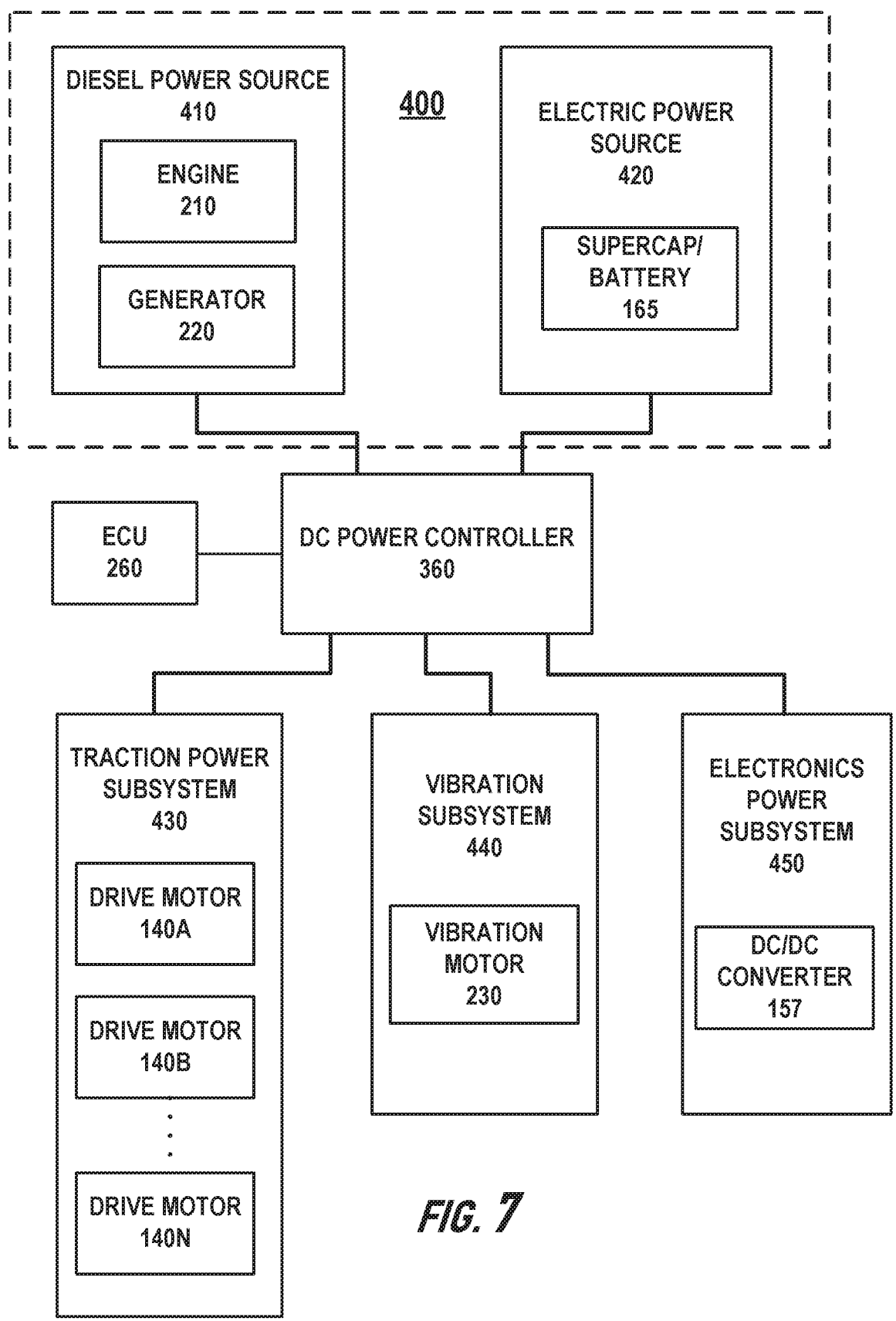
FIG. 7 is a block diagram that illustrates power subsystems of a single drum surface compactor machine according to some embodiments.

FIG. 7 is a block diagram illustrating various functional subsystems of an electrical system of a compactor 100 according to some embodiments. Referring to FIG. 7, an electrical system of a compactor 100 includes a hybrid power generation subsystem 400 including an internal combustion power source 410 including, for example, a diesel engine 210 and a generator 220 that supply electrical power generated via fuel combustion, and an electrical power source 420 including a supercapacitor and/or battery bank 165 that supply electrical power from a store of chemical or electrical potential energy. The power output by the hybrid power generation system 400 is supplied through the DC power controller under control of the ECU 260 to a plurality of electrical/electromechanical load subsystems including a traction power subsystem 430, a vibration subsystem 440 and an electronics power subsystem 450. The traction power subsystem 430 includes the drive motors 140A to 140N and related motor controllers 355A, 355B (FIG. 5B). The vibration subsystem 440 includes the vibration motor 230 and related motor controller 355C (FIG. 5B), and the electronics power subsystem 450 includes the DC/DC converter 157.

According to some embodiments, the ECU 260 obtains a planned operating profile of the compactor 100 and generates a predicted power expenditure schedule for the compactor 100 based on the planned operating profile. The ECU 260 determines, based on the predicted power expenditure schedule, whether a predicted energy expenditure of the compactor 100 will exceed an available energy of the compactor. If the ECU 260 determines that the predicted energy expenditure of the compactor will exceed the available energy of the compactor 100, the ECU 260 generates a modified operating profile and operates the compactor 100 according to the modified operating profile. In this manner, the ECU 260 may increase the efficiency of the compactor 100 by enhancing the power efficiency of the compactor 100, which may make more efficient use of available power resources and/or may decrease $CO_2$ emissions by the compactor 100.

Some embodiments attempt to optimize the power efficiency of the hybrid power system of a compactor 100 to provide more stable traction and continuous vibration of the drum 110 via rotation of an eccentric mass by the vibration motor 230.

This may enable the compactor 100 to increase substrate compaction and/or gain power efficiency, which can decrease the emission of $CO_2$ to the atmosphere. Moreover, some embodiments may enable the operation of a compactor 100 to be more fully automated, which can help to avoid and common mistakes during the compaction cycle.

Conventional compactor machines are designed to meet an expected power load during compaction. If the actual conditions are different than was anticipated during the design of the compactor, the resulting machine may be underpowered, in which case the machine may have difficulty completing its assigned tasks, or overpowered, such as by oversizing the engine, in which case the efficiency of the compactor may be diminished.

In the first scenario (i.e., when the compactor is underpowered), the overall power of the system may be unbalanced between the vibration motor and the traction (drive) system, which can cause diesel engine choking in a peak power condition, which can either stop the compactor or stop the vibration. Some embodiments can help to address this problem by using a series hybrid system that can implement a prioritization and balance of the power system.

In the second scenario (when the compactor is overpowered), the diesel engine may not work in its optimal range, as the peak power demand may not happen often in the work cycle. This can decrease the efficiency of the compactor and may result in an increase of the $CO_2$ emissions. Moreover, larger, heavier engines tend to be more expensive and use more fuel, increasing both the initial and operating cost of the compactor.

Some embodiments of the inventive concepts may control a hybrid power system for a compactor so that the power system uses and stores only the power that is actually needed by the compactor. Some embodiments can properly balance the power between the traction (drive) system and the vibration system and calculate the overall power balance through an entire compaction process to achieve a high-quality substrate compaction.

Some embodiments described herein may be implemented within a hybrid power unidrum compactor system. However, it will be appreciated that some embodiments of the inventive concepts maybe implemented in other types of equipment. Some embodiments provide systems/methods that manage the overall energy balance and compaction path calculation for a compactor that makes the compaction process more efficient by using and storing only the energy needed to complete the planned task. Moreover, some embodiments direct and/or prioritize the energy flow inside the hybrid system, which can make the compaction process more stable and avoid power system malfunctions. Further, some embodiments of the inventive concepts can help automate the compaction process based on the energy balance, which can help to avoid common human mistakes during the compaction process. During the operation of the compactor, energy may be gained through regenerative braking during balancing/descending, and such energy can be stored in an electrical power system, such as in supercapacitors, for subsequent use by the compactor.

According to some embodiments, a compactor 100 can be controlled manually via an HMI terminal 350 and/or automatically via programmatic control by the ECU 260. Manual control is done by an operator who sets operating parameters for the compactor 100 and may steers the compactor 100 via a joystick or other human-machine interface (HMI). Automatic control may be initiated and monitored via a display-based HMI such as a tablet that can be either mounted inside a paver ahead of the compactor and/or be held by the operator supervising the compaction process. In an automatic mode, the operating parameters of the task may be set before the start of compaction, and then the process may proceed automatically.

During the compaction process the control can be mixed (manual/automatic). Automatic control can be switched to manual and taken over by the operator, such as when the compactor traverses a hazardous area where very careful maneuvering is required, as in a path with a high angle of descent, curves, etc.

Before the beginning of a compaction process, using data provided by the sensors 372, the ECU 260 determines the total available energy in the system, including both the diesel power subsystem and the electric power subsystem, taking into account the state of charge of the supercapacitor bank and/or the electrochemical battery 165, the fuel level of the engine 210, and the ambient temperature. The ECU then generates a planned operating profile for the process based on parameters set by the operator, including compaction speed (exact or range), vibration frequency/amplitude, maximum compaction time, compaction distance and width of the compaction path, substrate type, substrate temperature and substrate thickness.

In the automatic mode, the compaction distance and path width can be marked on a map using the HMI 350 display with GPS/laser sensor localization. Based on the data provided, the ECU 260 calculates the estimated path of the compactor, which becomes part of the planned operating profile for the process. Based on the planned operating profile for the process, the ECU 260 generates a predicted power expenditure schedule for the planned process. The predicted power expenditure schedule specifies the expected power expenditure over the time frame of the proposed process for each of the power supply subsystems of the compactor 100 based on the overall planned activity.

Based on the predicted power expenditure schedule and the amount of energy available in the system, the ECU 260 may provide feedback to the operator about whether the planned operating profile is feasible. The ECU 260 may provide proposed corrections/modifications to the planned operating profile if needed.

In generating the modifications to the planned operating profile, the ECU 260 may apply one or more of the following objectives. In particular, the ECU 260 may attempt to prevent a loss of traction power during the compaction process. For example, a high peak power demand for vibration or a long compaction distance can result in a situation in which not enough power is provided to the traction motors. Stopping the compactor 100 on an uncompacted asphalt is highly undesirable, as it can cause dents and asphalt waving that cannot be easily removed.

The ECU 260 may also seek to reduce $CO_2$ emissions by changing into full-electric mode when the overall power consumption is low (for example during static compaction with vibration disabled).

If the system cannot meet the predicted power demand, the ECU 260 may inform the operator and provide suggestions for prioritizing between traction power (for example to lower the speed/torque in certain segments) and vibration power (for example, to lower the vibration power demand in certain segments) so that the proposed operating profile is achievable.

If the electrical power subsystem 420 is not fully charged, the ECU 260 may suggest that it be charged via an external (plug-in) charger prior to the compaction process, as plug-in charging may be more efficient than charging via engine power and may decrease $CO_2$ emissions by the compactor 100.

Based on the predicted power expenditure schedule and planned operating profile, the ECU 260 may suggest that the operator use another compactor in a tandem. If another compactor 100 is available, the compactor 200 may send a planned operating profile to the second compactor for the second compactor to follow.

Some examples of modifications to the planned operating profile of a compactor 100 are as follows. Such modifications may be made based on the control signals (manual control) or compaction path set before (automatic control) the operation. For example, the ECU 260 may modify the planned operating profile so that a first pass over the substrate is made static (no vibration). That is, the compactor 100 will automatically make the first pass without vibration to avoid moving of the asphalt (common when paver's pre-compaction not enough). In this case, full-electric mode may be preferred depending on the compaction path and other parameters.

In another example, the ECU 260 may check the temperature of the substrate. The compactor 100 may measure the temperature of the substrate and turn off the vibrations if the temperature exceeds a set range (e.g., a default 100-140° C.). If possible, the ECU 260 may switch the compactor 100 to full-electric mode.

In another example, the ECU 260 may cause the vibration to stop on compacted asphalt. The compactor 100 will turn off the vibrations automatically and switch to all-electric mode when it is on an already-compacted portion of the substrate. The determination of when the compactor 100 is on an already-compacted portion of the substrate may be made based on GPS data, temperature readings, etc.

In another example, the ECU 260 may cause the vibration to stop when compactor 100 stops. The compactor 100 will turn off the vibrations automatically and change into full-electric mode when the machine stops (by operator's order or emergency stop).

In another example, the ECU 260 may cause the vibration to stop when the compactor 100 changes path or direction. The compactor 100 will turn off the vibrations automatically when the machine turns and changes the compaction path or starts to compact in the reverse direction.

In another example, the ECU 260 may cause the vibration to stop when descending an inclined surface. The compactor 100 will stop vibration during a high angle descent and change into full electric mode with regenerative braking re-gaining some of the energy.

In some embodiments, the ECU 260 may continuously evaluate the planned/actual operating profile of the compactor 100 during the compaction process and provide real-time updates or recommendations to the operator via wireless communication. If the conditions of the compaction process change (for example actual higher power demand or control taken over by operator etc.) the ECU 260 may generate and transmit send suggested corrections to the planned operating profile to the operator.

In some embodiments, the compactor 100 may use regenerative braking (braking torque) done by electric traction motors when descending (also changing to full electric mode) or/and during balancing the drum that will supply energy back to the system (DC-link) and store it in the electrical power subsystem 420, such as by storing the energy in a supercapacitor bank.

The electrochemical batteries in the electrical power subsystem 420 may include lithium-Ion batteries that can store the energy and maintain a more precise voltage range on the DC power bus 315 for a much longer time than a supercapacitor bank can. It will be understood, however, that while an electrochemical battery such as a Li-ion battery may be capable of storing more energy than a supercapacitor bank, a supercapacitor bank may be capable of supplying a higher peak power than an electrochemical battery.

The use of Li-Ion batteries can provide more possibilities for utilizing full-electric mode while prioritizing the energy flow within the system and reducing $CO_2$ emission. In some applications, the use of a Li-ion based energy source may eliminate the need for a diesel/combustion based energy source altogether.

Without a diesel engine, the range and power of the compactor 100 would be strictly limited, in which case the power management systems/techniques described herein would be even more important to the compaction process.

Figure 8A:
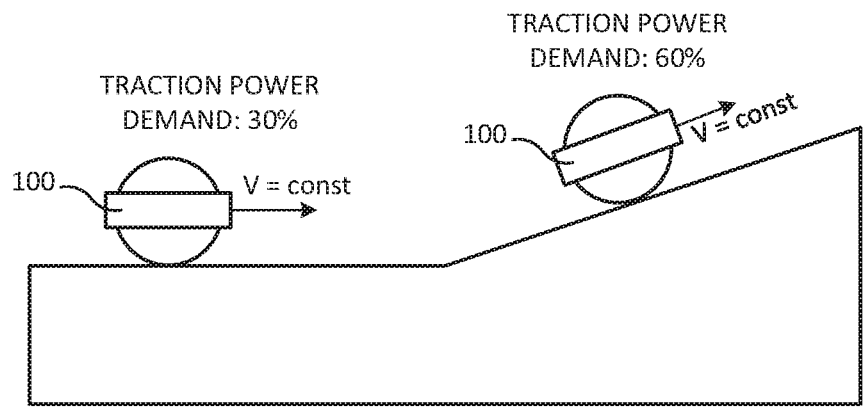
FIGS. 8A and 9A illustrate operation of a single drum surface compactor machine according to some embodiments.
Figure 8B:
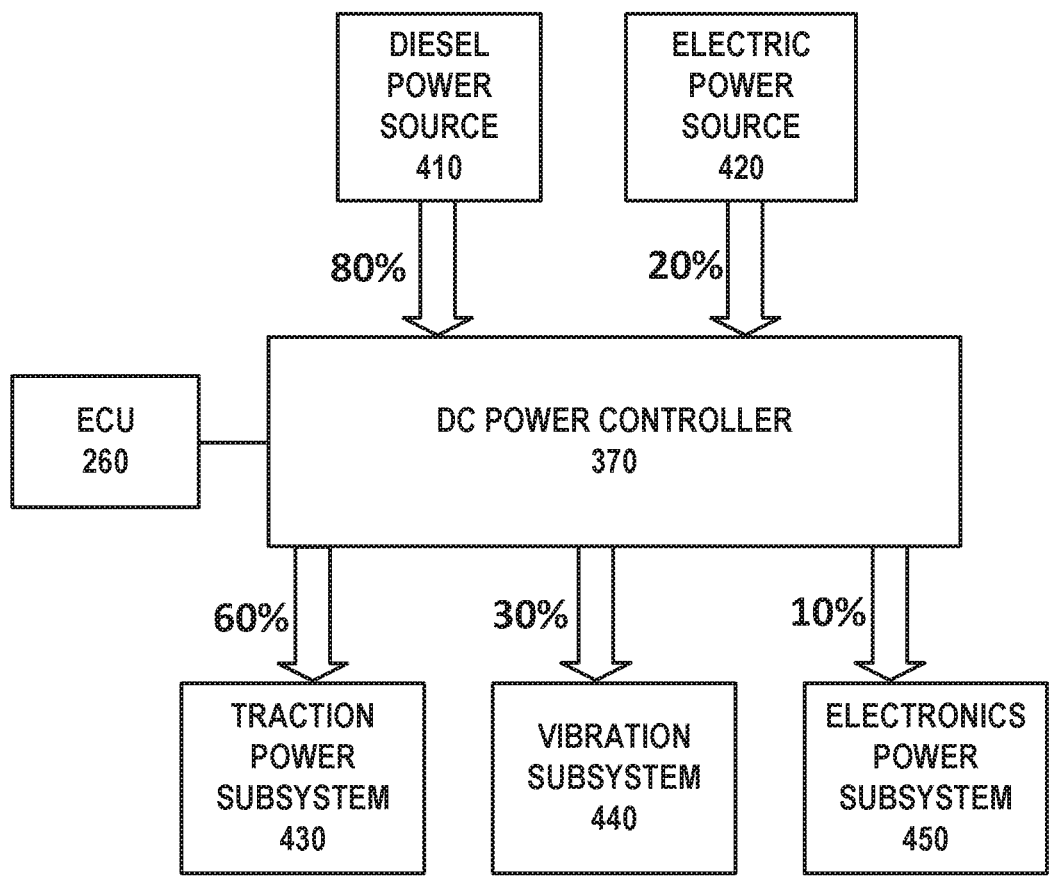
FIGS. 8B and 9B are block diagrams that illustrate allocation of electric power among power subsystems of a single drum surface compactor machine according to some embodiments.

FIGS. 8A and 8B illustrate an example of dynamic power management in a compactor 100 according to some embodiments. Referring to FIG. 8A, a compactor 100 traveling on a horizontal surface at a constant velocity may require 30% of the available power being generated by the power generation subsystems of the compactor 100. However, when the compactor 100 moves onto an inclined surface, the power requirement may increase, for example to 60% of available power, to maintain the constant velocity. FIG. 8B is a block diagram illustrating control of the various power subsystems of the compactor 100, including the internal combustion power source 410, the electric power source 420, the traction power subsystem 430, the vibration subsystem 440 and the electronics power subsystem 450. The flow of power to/from the various subsystems is controlled by the ECU 260 via the DC power controller 370. The ECU 260 predicts power requirements of the compactor 100 based on the planned operating profile and determines how to efficiently generate power and allocate available power to meet the operating requirements of the compactor 100. For example, while the compactor is on the horizontal surface of FIG. 8A, the ECU 260 may control the DC power controller 370 to direct 30% of available power to the traction power subsystem 430. When the compactor is on the inclined surface, the ECU 260 may control the DC power controller 370 to direct 60% of available power to the traction power subsystem 430. In some cases, power to other subsystems may be reduced to make the extra traction power available. Alternatively, the ECU 260 may cause the internal combustion power source 410 and/or the electric power source to supply more power so that power to other load subsystems does not have to be reduced to accommodate the increased power demands of the traction power subsystem 430.

If the ECU 260 is unable to control the power subsystems to obtain the desired result (because, for example, there is not enough energy or power to complete a planned task, or a parameter required to complete the task is out of range), the ECU 260 may notify the operator via the HMI 350 of that fact and suggest possible changes to the planned operating profile. For example, continuing with the example of FIG. 8A, if the internal combustion and electric power sources 410, 420 are unable to supply enough power to maintain the desired speed of the compactor 100 on the inclined surface, the ECU 260 may recommend modifying the planned operating profile to reduce the speed of the compactor 100 on the incline, to increase the amount or percentage of power being supplied by one or both of the power sources, to decrease the power supplied to another one of the load subsystems, etc.

Figure 9A:
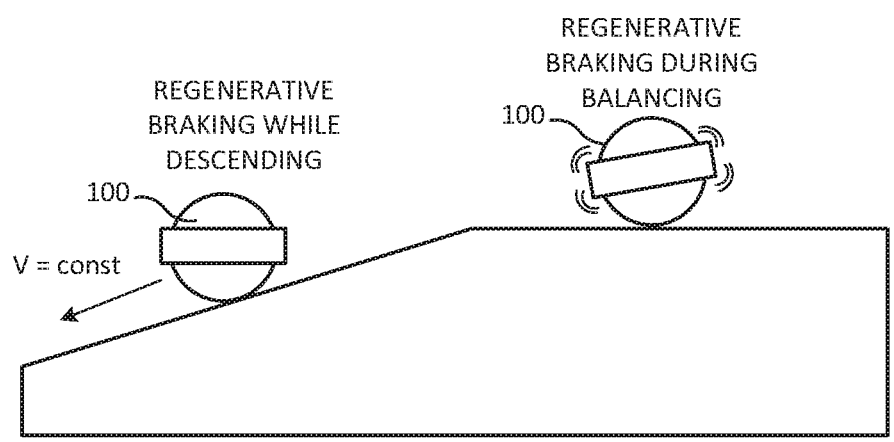
Figure 9B:
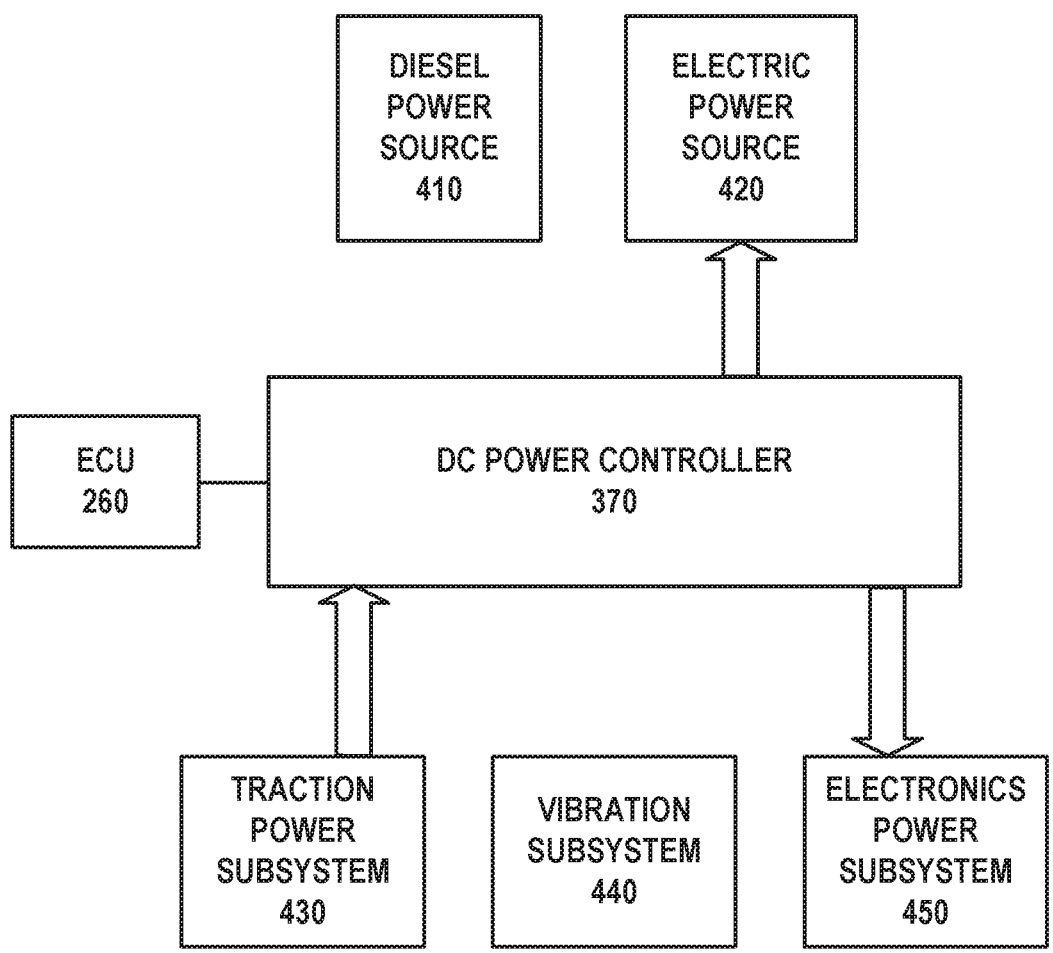

FIGS. 9A and 9B illustrate an example of the use of regenerative braking. As is known in the art, regenerative braking occurs when the drive motors are used as brakes to dissipate kinetic energy of the compactor 100. In regenerative braking, the drive motors are driven in reverse and electromagnetic energy is recovered from the drive motors. That is, when mechanical energy is applied to the drive shaft from an external source, a back-emf voltage appears at the terminals of the motor. This voltage can be used to charge a battery or supercapacitor. When the compactor descends an inclined slope as shown in FIG. 9A, instead of allowing the potential energy of the compactor 100 to be converted into kinetic energy, the potential energy released by the compactor 100 is used to drive the drive motors, essentially operating them as generators. In that case, as shown in FIG. 9B, DC power is supplied from the traction power subsystem 430 to the electric power source 420 under the control of the DC power controller 370. Such power can be used, for example, to charge a battery or supercapacitor in the electric power source 420. As illustrated in FIG. 9A, regenerative braking can be employed whenever the drive motors are being used as brakes, such as when the compactor 100 is descending an incline or when it is balancing.

Figure 10:
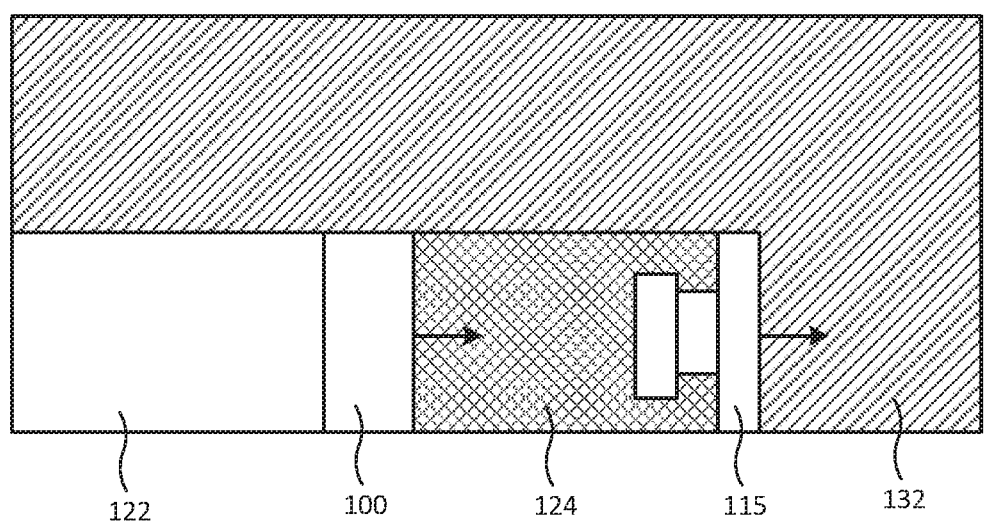
FIG. 10 is a schematic diagram illustrating operation of a single drum surface compactor machine according to some embodiments.

FIG. 10 illustrates operation of a compactor 100 that is executing a planned operating profile. In the example of FIG. 10, a compactor 100 follows behind a paver 115 that is paving an unpaved surface 132. The compactor 100 follows behind the paver 115 on the paved substrate 124 an compacts the paved substrate 124, leaving behind a compacted substrate 122 in its path. The compactor 100 may follow a pre-planned route and/or may be guided by laser guides projected by the paver 115 and/or via GPS signals received by the compactor 100. A planned operating profile may take into account the length of the path along with any direction or elevation changes, as well as the nature and type of substrate being compacted.

Figure 11:
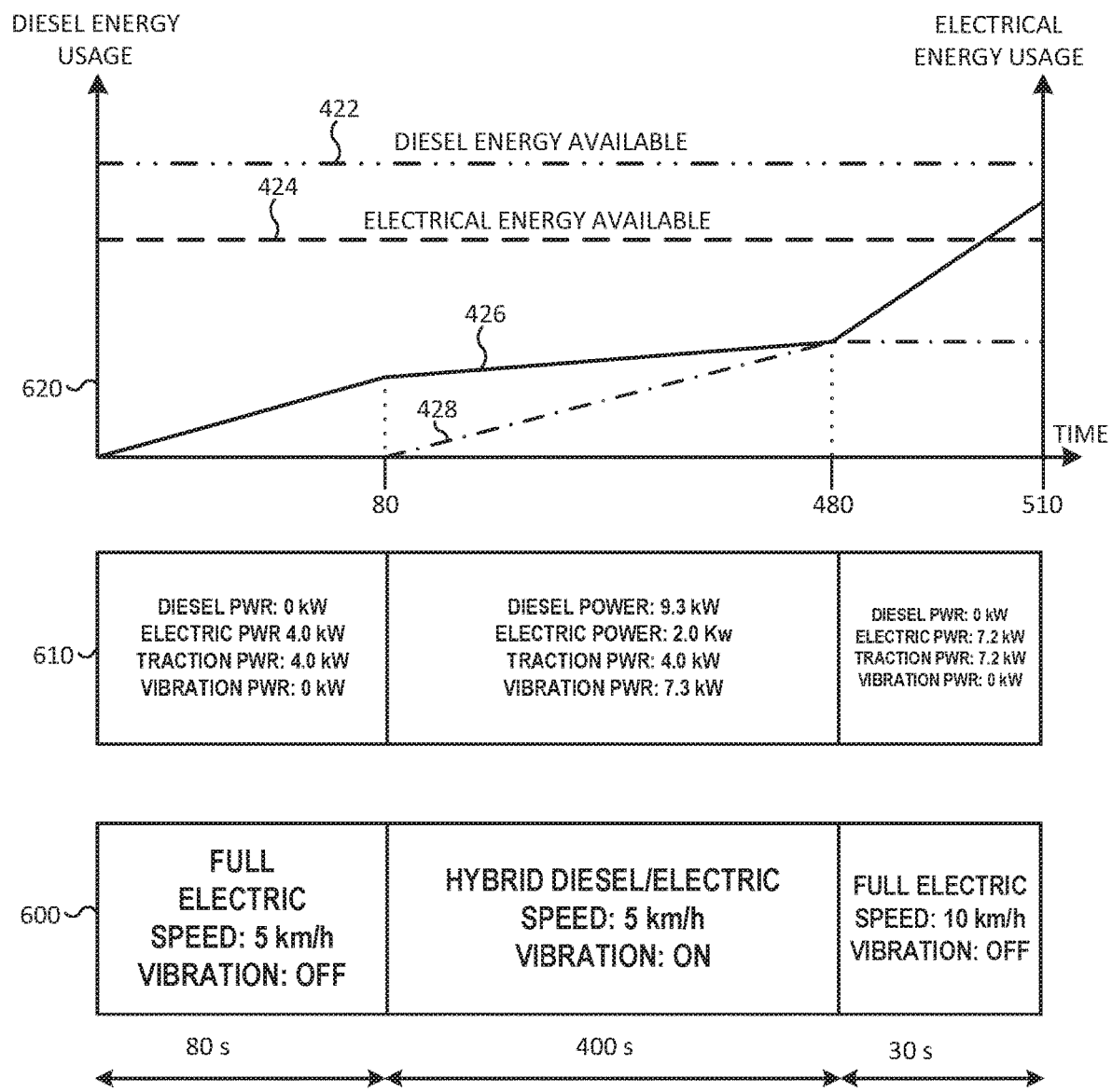
FIG. 11 is a graph that illustrates a planned operating profile of a single drum surface compactor machine according to some embodiments.

FIG. 11 illustrates an example of a planned operating profile 600 of a compactor 100 along with a predicted power expenditure schedule 610 and a graph 620 of predicted energy usage based on the planned operating profile. As shown therein, according to the planned operating profile 600, the compactor 100 will operate for 80 seconds in full electric mode at a speed of 5 km/h with the vibration motor off. After that, the compactor 100 will operate for 400 seconds in hybrid diesel/electric mode at a speed of 5 km/h with the vibration motor on. Finally, the compactor 100 will operate for 30 seconds in full electric mode at a speed of 10 km/h with the vibration motor off. Based on the planned operating profile and the sensor data collected by the ECU 260 or other data provided to the ECU 260, (e.g., ambient temperature, substrate type, temperature and thickness, etc.), the ECU generates a predicted power expenditure schedule 610 that specifies the amount of power generated or consumed by each of the subsystems at all relevant times covered by the planned operating profile 600. (In this example, power consumed by the electronics power subsystem 450 is ignored).

The predicted power expenditure schedule 610 shows that in the first segment, the power generated by the internal combustion power source 410 will be 0 kW while the electric power generated by the electric power source 420 will be 4.0 kW, all of which will be consumed by the traction power subsystem 430. In the second segment, 9.3 kW of power will be generated by the internal combustion power source 410 and 2.0 kW will be generated by the electric power source 420. The traction power subsystem 430 will consume 4.0 kW of the generated power, while the vibration subsystem 440 will consume 7.3 kW of the generated power. In the third segment, the power generated by the internal combustion power source 410 will again be 0 kW. The electric power generated by the electric power source 420 will be 7.2 kW, all of which will again be consumed by the traction power subsystem 430.

The graph 620 of predicted energy usage shows a level of diesel energy available 422 and electrical energy available 424. The amount of diesel energy available is based on the fuel level of the diesel engine, while the electrical energy available is based on the state of charge of the batteries and/or supercapacitors in the electrical power source 420. Appropriate safety/reserve margins may be added. Curve 426 shows the energy usage of the electric power source 420 over the course of the planned operating profile based on the predicted power expenditure schedule, while curve 428 shows the energy usage of the internal combustion power source 410 over the course of the planned operating profile. As shown in the graph, at the end of the planned operating profile, the internal combustion power source 410 is predicted to have used less than the available diesel energy 422, but the electric power source 420 is predicted to have used more than the available electric energy 424.

Figure 12:
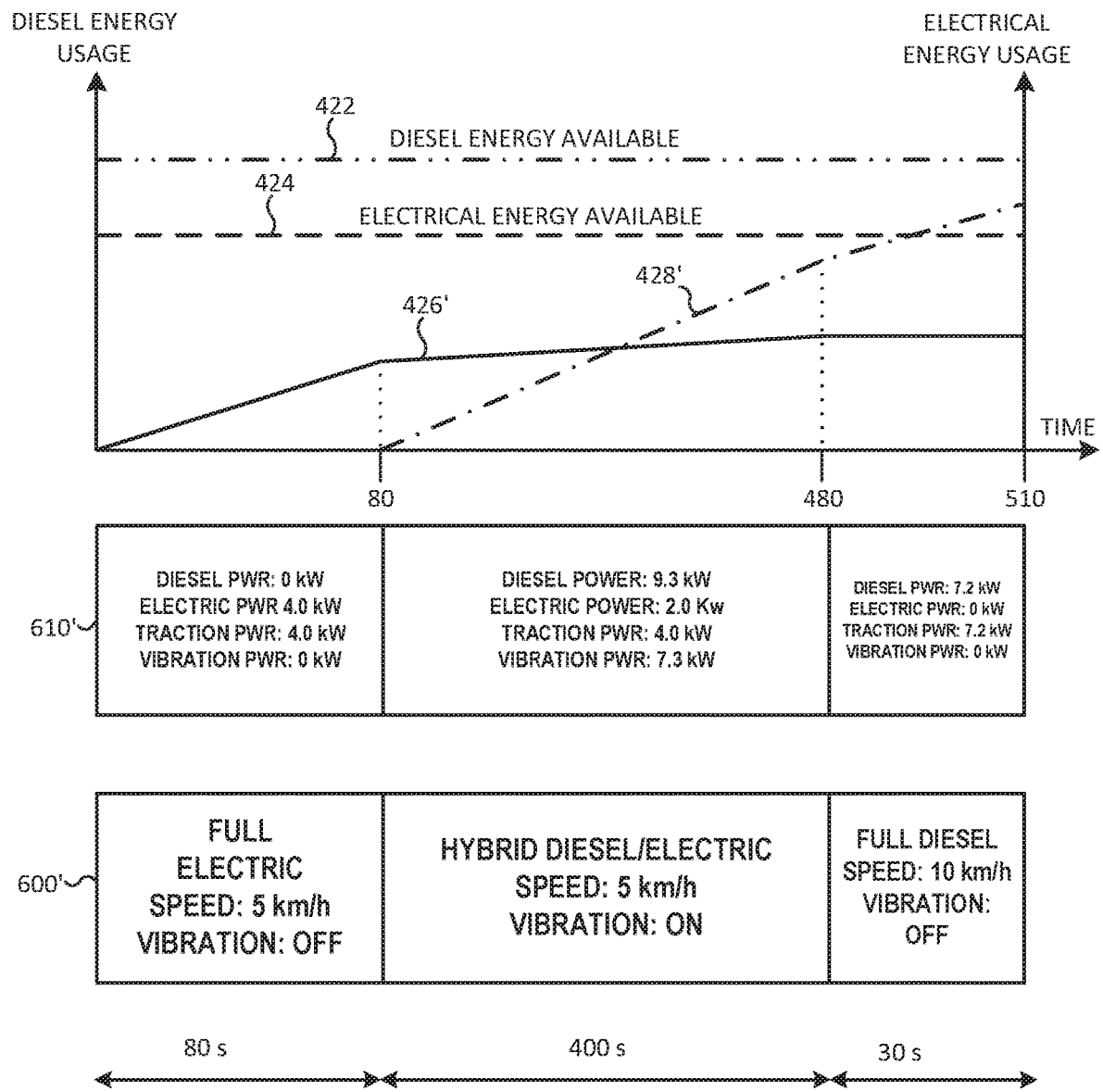
FIG. 12 is a graph that illustrates a modified operating profile of a single drum surface compactor machine according to some embodiments.

In that case, the ECU 460 may recommend a modification to the planned operating profile to ensure that the predicted energy usage does not exceed either the total diesel energy available or the total electric energy available. FIG. 12 shows an example of such a proposed modification. In particular, FIG. 12 shows a modified planned operating profile 600' and a modified predicted power expenditure schedule 610' in which the compactor 100 is operated on full diesel power in the third segment. Curve 426' shows the energy usage of the electric power source 420 over the course of the modified planned operating profile 600' based on the modified predicted power expenditure schedule 610', while curve 428' shows the energy usage of the internal combustion power source 410 over the course of the modified planned operating profile 600'. As shown in the graph, at the end of the planned operating profile, the internal combustion power source 410 is predicted to have used less than the available diesel energy 422, and the electric power source 420 is predicted to have used less than the available electric energy 424.

It will be appreciated that it is possible in some embodiments for the DC power controller 370 increase the power output of the diesel power source 410 to exceed the power demanded by the drive and vibration motors. In that, case the battery/supercap 165 in the electric power source 420 can be charged by the power source 410 during system operation. That is, the motor demand may be covered 100% from diesel power, with additional remaining power being used to charge the electrical power source 420.

Figure 13:
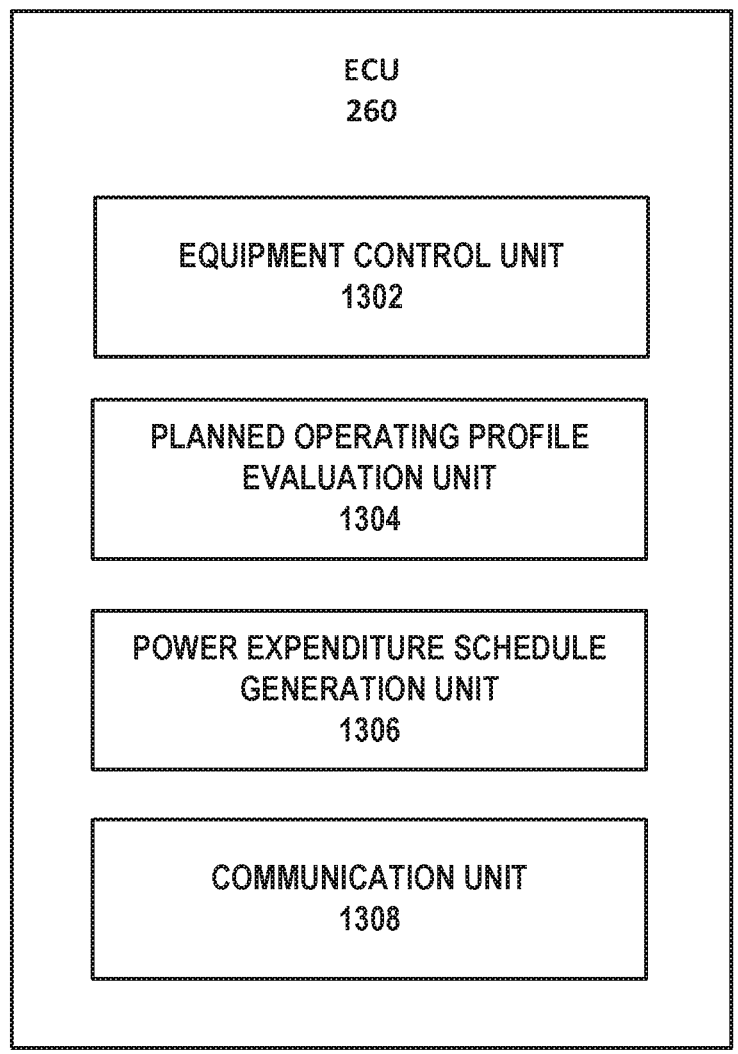
FIG. 13 is a block diagram illustrating functional aspects of an electronic control unit for a single drum surface compactor machine according to some embodiments.

FIG. 13 is a block diagram illustrating certain functional units of an ECU 260. In particular, an ECU 260 according to some embodiments includes an equipment control unit 1302 that controls the operation of functional subsystems of a compactor, including the hybrid power generation subsystem 400, the traction power subsystem 430, the vibration subsystem 440 and the electronics power subsystem 450. The ECU 260 further includes a planned operating profile evaluation unit 1304 that constructs and/or evaluates a planned operating profile for the compactor 100. In particular, planned operating profile evaluation unit 1304 may receive user and/or sensor inputs to construct a planned operating profile of the compactor 100. The ECU 260 further includes a power expenditure schedule generation unit 1306 that generates a power expenditure schedule for the compactor 100 based on the planned operating profile. The power expenditure schedule may be calculate the overall energy and power available to complete a task taking into account factors such as the state of charge of an electrical power source, the fuel level of a diesel power source, the ambient temperature, inputs by the operator, and other factors. Based on the power expenditure schedule, the ECU 260 may generate a modified operating profile that meets one or more planning criteria, such as reducing or minimizing total power usage, reducing $CO_2$ emissions, reducing operating time, etc. The ECU 260 further includes a communication unit 1308 for communicating proposed changes or other information about a planned operating profile or the predicted power expenditure schedule to an operator.

Figure 14:
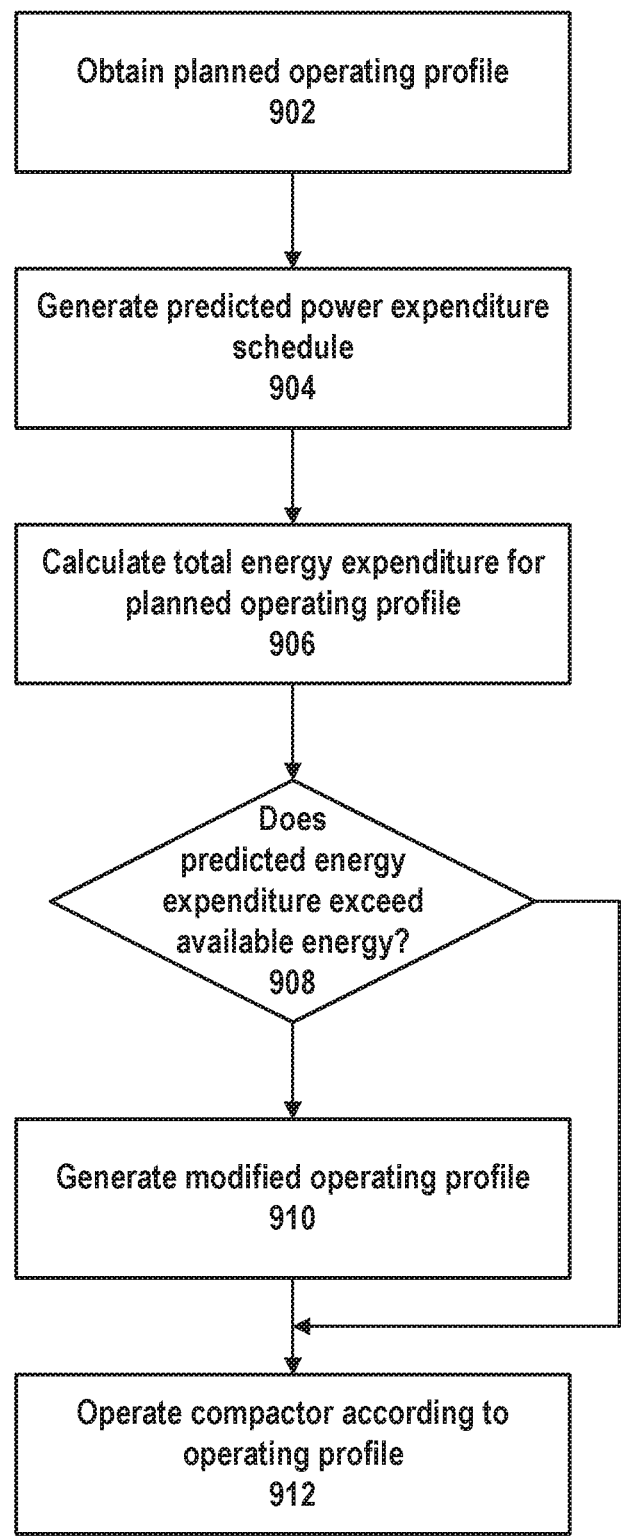
FIG. 14 is a flowchart illustrating operations of an electronic control unit for a single drum surface compactor machine according to some embodiments.

Operations of an ECU 260 of a compactor 100 according to some embodiments are illustrated in the flowchart of FIG. 14. As shown therein, the ECU 260 obtains a planned operating profile of the compactor 100 (block 902) and generates a predicted power expenditure schedule for the compactor 100 based on the planned operating profile (block 904). The ECU 60 calculates a total energy expenditure for the planned operating profile (block 906), and determines (908), based on the predicted power expenditure schedule, whether a predicted energy expenditure of the compactor 100 will exceed an available energy of the compactor. If the ECU 260 determines that the predicted energy expenditure of the compactor will exceed the available energy of the compactor 100, the ECU 260 generates (910) a modified operating profile and operates (912) the compactor 100 according to the modified operating profile.

The planned operating profile of the compactor may include a predicted movement path and a predicted vibration profile for the compactor.

Generating the modified operating profile may include modifying the predicted movement path or the predicted vibration profile of the compactor.

The planned operating profile of the compactor may include a predicted power expenditure schedule, and generating the modified operating profile may include modifying the predicted power expenditure schedule of the compactor.

The predicted power expenditure schedule of the compactor may specify sources of power for the compactor over a range of operation covered by the planned operating profile of the compactor.

The compactor may include a hybrid power source including an electric power source and an internal combustion engine, and the power source profile may specify a first percentage of power supplied by the electric power source and a second percentage of power supplied by the internal combustion engine over a time period covered by the power source profile.

The planned operating profile of the compactor may include a predicted power expenditure schedule that specifies how power generated by the compactor is allocated among a plurality of operating subsystems of the compactor, and generating the modified operating profile may include modifying the predicted power expenditure schedule of the compactor.

The plurality of operating subsystems of the compactor include a traction power subsystem, a vibration subsystem and an electronics power subsystem.

Generating the modified operating profile may include reducing a power budget of one of the plurality of operating subsystems of the compactor.

The electronic control unit may, in response to determining that the predicted energy expenditure of the compactor exceeds the available energy of the compactor, display an informational message to an operator of the compactor.

The predicted power expenditure schedule may be based on a fuel level of the compactor, ambient temperature, compaction speed, vibration frequency, vibration amplitude, maximum compaction time, compaction distance, width of compaction track, compaction substrate type, compaction substrate temperature, and/or compaction substrate thickness.

In some embodiments, the predicted power expenditure schedule may be based on a state of charge of the supercapacitor or the chemical battery.

According to some embodiments, a control system for a compactor 100 according to some embodiments includes a compaction range and compaction path estimator that uses sensor data to calculate the overall energy and power available to complete a task taking into account factors such as the state of charge of an electrical power source, the fuel level of a diesel power source, the ambient temperature, inputs by the operator, and other factors and responsively generates a proposed operating plan with path routing, energy balance calculation, and optimization of hybrid and full electric modes to ensure adequate power is available for the paving operation while reducing emissions and also providing the operator feedback regarding proposed corrections to the plan if the power demand cannot be met by the system.

Although embodiments of the inventive concepts have been described herein in the context of an autonomous single roller surface compactor, it will be appreciated that the inventive concepts described herein can be applied and/or implemented in many different types of surface compactors and other construction vehicles. For example, the power/energy management systems/methods may be advantageously employed in construction vehicles such as pavers, haulers, excavators, loaders, pipe layers, etc.

FURTHER DEFINITIONS AND EMBODIMENTS

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The foregoing description of the embodiments of the inventive concepts has been presented for the purpose of illustration and is not intended to be exhaustive or to limit the invention to the precise forms disclosed. Persons skilled in the relevant art can appreciate that many modifications and variations are possible in light of the above teachings. It is therefore intended that the scope of the inventive concepts be limited not by this detailed description, but rather by the claims appended hereto.

What is claimed is:

1. An electronic control unit for a compactor, the electronic control unit comprising:
    a processor circuit; and
    a memory coupled to the processor circuit, wherein the memory comprises computer readable program instructions that, when executed by the processor circuit, cause the electronic control unit to perform operations comprising:
        obtaining a planned operating profile of the compactor, the planned operating profile of the compactor comprising a predicted movement path and a predicted vibration profile for the compactor;
        generating a predicted power expenditure schedule for the compactor based on the planned operating profile;
        determining, based on the predicted power expenditure schedule, that a predicted energy expenditure of the compactor exceeds an available energy of the compactor;
        generating a modified operating profile in response to determining that the predicted energy expenditure of the compactor exceeds the available energy of the compactor; and
        operating the compactor according to the modified operating profile,
    wherein the predicted power expenditure schedule of the compactor specifies sources of power for the compactor over a range of operation covered by the planned operating profile of the compactor, and
    wherein the compactor comprises a hybrid power source including an electric power source and an internal combustion engine, and wherein the predicted power expenditure schedule specifies a first percentage of power supplied by the electric power source and a second percentage of power supplied by the internal combustion engine over a time period covered by the predicted power expenditure schedule, to ensure adequate power is available for the paving operation while reducing emissions.

2. The electronic control unit of claim 1, wherein the computer readable program instructions further cause the electronic control unit to:

in response to determining that the predicted energy expenditure of the compactor exceeds the available energy of the compactor, displaying an informational message to an operator of the compactor.

3. The electronic control unit of claim 1, wherein generating the modified operating profile comprises modifying the predicted movement path or the predicted vibration profile of the compactor.

4. The electronic control unit of claim 1, wherein generating the modified operating profile comprises modifying the predicted power expenditure schedule of the compactor.

5. The electronic control unit of claim 1, wherein the predicted power expenditure schedule is based on a fuel level of the compactor, ambient temperature, compaction speed, vibration frequency, vibration amplitude, maximum compaction time, compaction distance, width of compaction track, compaction substrate type, compaction substrate temperature, and/or compaction substrate thickness.

6. The electronic control unit of claim 1, wherein the electric power source comprises a supercapacitor and/or an electrochemical battery.

7. The electronic control unit of claim 6, the predicted power expenditure schedule is based on a state of charge of the supercapacitor or the electrochemical battery.

8. The electronic control unit of claim 1, wherein the planned operating profile of the compactor comprises a predicted power expenditure schedule that specifies how power generated by the compactor is allocated among a plurality of operating subsystems of the compactor, and wherein generating the modified operating profile comprises modifying the predicted power expenditure schedule of the compactor.

9. The electronic control unit of claim 8, wherein the plurality of operating subsystems of the compactor comprise a traction power subsystem, a vibration subsystem and an electronics power subsystem.

10. The electronic control unit of claim 9, wherein generating the modified operating profile comprises reducing a power budget of one of the plurality of operating subsystems of the compactor.

11. A method of operating an electronic control unit for a compactor, comprising:
obtaining a planned operating profile of the compactor, the planned operating profile of the compactor comprising a predicted movement path and a predicted vibration profile for the compactor;
generating a predicted power expenditure schedule for the compactor based on the planned operating profile;
determining, based on the predicted power expenditure schedule, that a predicted energy expenditure of the compactor exceeds an available energy of the compactor;
generating a modified operating profile in response to determining that the predicted energy expenditure of the compactor exceeds the available energy of the compactor; and
operating the compactor according to the modified operating profile,
wherein the predicted power expenditure schedule of the compactor specifies sources of power for the compactor over a range of operation covered by the planned operating profile of the compactor,
wherein the compactor comprises a hybrid power source including an electric power source and an internal combustion engine, and wherein the predicted power expenditure schedule specifies a first percentage of power supplied by the electric power source and a second percentage of power supplied by the internal combustion engine over a time period covered by the predicted power expenditure schedule, to ensure adequate power is available for the paving operation while reducing emissions.

12. The method of claim 11, wherein generating the modified operating profile comprises modifying the predicted movement path or the predicted vibration profile of the compactor.

13. The method of claim 11, wherein generating the modified operating profile comprises modifying the predicted power expenditure schedule of the compactor.

14. The method of claim 11, wherein the planned operating profile of the compactor comprises a predicted power expenditure schedule that specifies how power generated by the compactor is allocated among a plurality of operating subsystems of the compactor, and wherein generating the modified operating profile comprises modifying the predicted power expenditure schedule of the compactor.

15. The method of claim 14, wherein the plurality of operating subsystems of the compactor comprise a traction power subsystem, a vibration subsystem and an electronics power subsystem, and wherein generating the modified operating profile comprises reducing a power budget of one of the plurality of operating subsystems of the compactor.

16. A computer program product comprising a non-transitory computer readable storage medium having computer readable program code embodied in the medium, the computer readable program code comprising computer program instructions that, when executed on a processor circuit of an electronic control unit of a compactor, cause the electronic control unit to perform operations comprising:
obtaining a planned operating profile of the compactor, the planned operating profile of the compactor comprising a predicted movement path and a predicted vibration profile for the compactor;
generating a predicted power expenditure schedule for the compactor based on the planned operating profile;
determining, based on the predicted power expenditure schedule, that a predicted energy expenditure of the compactor exceeds an available energy of the compactor;
generating a modified operating profile in response to determining that the predicted energy expenditure of the compactor exceeds the available energy of the compactor; and
operating the compactor according to the modified operating profile,
wherein the predicted power expenditure schedule of the compactor specifies sources of power for the compactor over a range of operation covered by the planned operating profile of the compactor,
wherein the compactor comprises a hybrid power source including an electric power source and an internal combustion engine, and wherein the predicted power expenditure schedule specifies a first percentage of power supplied by the electric power source and a second percentage of power supplied by the internal combustion engine over a time period covered by the predicted power expenditure schedule, to ensure adequate power is available for the paving operation while reducing emissions.

* * * * *